United States Patent [19]
Kersey et al.

[11] Patent Number: 5,870,245
[45] Date of Patent: Feb. 9, 1999

[54] MODULAR CABINET FOR DATA STORAGE MEDIA AND DRIVES

[75] Inventors: Kevin T. Kersey; Jeffrey S. McGee; Christopher E. Baker, all of San Diego, Calif.

[73] Assignee: Overland Data, Inc., San Diego, Calif.

[21] Appl. No.: 555,776

[22] Filed: Nov. 9, 1995

[51] Int. Cl.$^6$ .................................................. G11B 15/68
[52] U.S. Cl. ................................ 360/92; 369/36; 369/178
[58] Field of Search .................................. 360/92, 99.02, 360/99.06; 369/34, 36, 178, 191, 192

[56] References Cited

U.S. PATENT DOCUMENTS

| | | | |
|---|---|---|---|
| 3,938,190 | 2/1976 | Semmlow et al. | 360/72 |
| 4,504,936 | 3/1985 | Faber et al. | 369/34 |
| 4,754,397 | 6/1988 | Varaiya et al. | 364/200 |
| 4,779,151 | 10/1988 | Lind et al. | 360/92 |
| 4,918,548 | 4/1990 | O'Donnell et al. | 360/92 |
| 4,937,690 | 6/1990 | Yamashita et al. | 360/92 |
| 4,945,429 | 7/1990 | Munro et al. | 360/92 |
| 4,984,106 | 1/1991 | Herger et al. | 360/92 |
| 5,003,417 | 3/1991 | Grant | 360/93 |
| 5,022,019 | 6/1991 | Motoyoshi et al. | 369/36 |
| 5,034,935 | 7/1991 | Ishibashi et al. | 369/36 |
| 5,121,483 | 6/1992 | Monahan et al. | 395/275 |
| 5,197,055 | 3/1993 | Hartung et al. | 369/34 |
| 5,235,474 | 8/1993 | Searle | 360/92 X |
| 5,274,516 | 12/1993 | Kakuta et al. | 360/92 |
| 5,277,534 | 1/1994 | Anderson et al. | 360/92 X |
| 5,285,333 | 2/1994 | Barr et al. | 360/92 |
| 5,303,214 | 4/1994 | Kulakowski et al. | 369/34 |
| 5,315,444 | 5/1994 | Ishiguro et al. | 360/15 |
| 5,341,258 | 8/1994 | Chalmers et al. | 360/92 |
| 5,345,350 | 9/1994 | Ellis et al. | 360/92 |
| 5,377,121 | 12/1994 | Dimitri et al. | 364/478 |
| 5,386,516 | 1/1995 | Monahan et al. | 395/275 |
| 5,388,946 | 2/1995 | Baur | 414/281 |
| 5,395,199 | 3/1995 | Day, III et al. | 414/267 |
| 5,416,650 | 5/1995 | Otonomiya et al. | 360/92 |
| 5,418,763 | 5/1995 | Ichikawa et al. | 369/30 |
| 5,429,470 | 7/1995 | Nicol et al. | 360/92 X |
| 5,481,514 | 1/1996 | Yamasaki et al. | 369/36 |

OTHER PUBLICATIONS

*IBM Technical Disclosure Bulletin* 34(9):447–448 (1992) "Gripping and Moving a Cassette Without a Gripper".

P. Livingston, et al., (1990), "The M.A.R.C. II System: A Modular Multiple Robotic Record/Play Videocassette System", *SMPTE Journal* 6:448–452.

InfiniDisc by Dynatek brochure, printed in Canada, Nov. 1994.

Mainframe Class Storage For Open Systems by Spectra Logic, unknown print date.

*Primary Examiner*—William R. Korzuch
*Attorney, Agent, or Firm*—Knobbe, Martens, Olson & Bear, LLP

[57] ABSTRACT

A data storage and retrieval system minimizes mechanical complexity and maximizes system flexibility by providing a modular rack mountable system which includes a passive transfer carriage for transferring media elements within the system. An active transfer carriage including a picker which is adapted to engage a notch on the media elements is also provided. The active transfer carriage may transfer media elements to the passive transfer carriage, and may also retrieve them from the passive transfer carriage. Drive actuation is automated with an extendable plunger which is adapted to engage an end of an actuation arm coupled to a media element reader such as a tape drive.

7 Claims, 10 Drawing Sheets

MODULAR CABINET FOR DATA STORAGE MEDIA AND DRIVES

BACKGROUND OF THE INVENTION

The present invention relates to data processing systems, and more specifically, to automated modular cabinets for storing and accessing data storage media such as tape cartridges, magnetic disks, and optical disks.

Magnetic tape cartridges, magnetic disks, and optical disks are all widely used as peripheral memory storage devices for computer systems. Large computer systems often operate in conjunction with external libraries of dozens of media elements as well as the media element readers used to retrieve and record data. Although originally such media elements were selected and loaded manually, automated libraries were developed to expedite the handling of the media. These systems include means for accessing a desired media element, retrieving it from its storage position, and loading it into an appropriate reader.

As data storage requirements for computer systems have increased from megabytes to gigabytes to terabytes, the development of automated media libraries has received considerable attention. Some embodiments of such libraries comprise a small number of magnetic tape cartridges, six or ten being typical, and one or two tape drives housed in a single enclosure. An automated library of this type is described in U.S. Pat. No. 4,918,548 to O'Donnell. This format has additionally been expanded on in two ways. In some systems, cabinet sized housings have been developed which hold a much larger number of tapes and drives, and which further comprise robotic arms, usually translatable on all three axes, which remove tapes from storage and place them in tape drives. An example of a system of this type is disclosed in U.S. Pat. No. 4,984,106 to Herger et al. In other systems, several smaller libraries are placed together in a single rack, and are provided with a common control system. A commercially available embodiment of such a system is the TapeFrame™ library from Spectra Logic in Boulder, Colo.

Modular systems have also been developed wherein media elements are housed in some modules of the system, and media element readers are housed in other modules. Two systems of this type are disclosed in U.S. Pat. No. 4,504,936 to Faber et al., and U.S. Pat. No. 5,285,333 to Barr et al. Such modular systems typically comprise a mechanism for moving media within each module, as well as a mechanism for moving media from module to module. An advantage of such systems is that increased data storage capacity and increased reading/writing capacity can be independently provided by adding either media or drive modules respectively.

Given the ever increasing data storage capacity requirements of modern computer systems, improvements in simplicity, cost, and system flexibility of tape and other storage media libraries is highly desirable. Specifically, it is desirable to provide media transfer robotics which utilize as few moving parts as possible. It is also desirable to provide system flexibility which allows the use of drive, media, and combination drive/media modules, and which allows easy interchangeability of the modules to adapt to changing host system requirements. The prior art has significant drawbacks in both of these areas.

In U.S. Pat. No. 5,285,333 to Barr et al. for example, a clamp type cartridge gripper is described which is attached to an elevator for transporting media vertically to different modules. Clamping grippers of this sort are widely used in media libraries to grasp and pull media cartridges from their storage locations. These grippers are complicated mechanically, and often fail to solidly grip the media. Furthermore, they are typically solenoid actuated, and therefore require an electrical connection to the library controller circuitry such that when provided on an elevator or other moving robotic arm, stress and wear of the interconnecting wiring is a concern. A clamping gripper is avoided in the system disclosed in U.S. Pat. No. 4,918,548 to O'Donnell et al. This patent discloses a pawl which engages a notch on a magnetic tape cartridge. Although some drawbacks of a clamping gripper are thereby avoided, a complicated articulating structure is utilized to ensure that the pawl engages the notch only at the appropriate time.

The modularity of the prior art has also been limited in scope. For example, the system disclosed in the Barr et al. patent mentioned above contains media modules and drives, but no combination media/drive modules. The same is true in the optical disc library infiniDISC™, commercially available from Dynatek in Toronto, Canada. Furthermore, library systems utilizing combination media/drive modules (such as the TapeFrame™ library mentioned above) have not provided for inter-module swapping of media.

Accordingly, it would be beneficial to provide data storage media libraries with increased simplicity, reduced cost, and increased flexibility over those currently available. Such an improved system should incorporate robotics having a minimum of moving parts, and should maximize the benefits of the modular format.

SUMMARY OF THE INVENTION

The present invention provides an improved data storage and retrieval apparatus for computer systems. The data storage and retrieval apparatus of the present invention is less complex mechanically, and provides increased flexibility over prior art systems.

It is one aspect of the present invention to provide a system which includes a plurality of modules mounted in a cabinet, wherein at least one of the modules houses a plurality of media elements, wherein at least one of the modules houses one or more media element readers, and wherein at least two of the modules incorporate an integral pass through slot for passing media elements into and out of the module. Furthermore, a passive transfer carriage external to the modules is provided. The passive transfer carriage is positionable adjacent to the pass through slots such that the passive transfer carriage accepts media elements from one module and delivers them to another module. Preferably, the passive transfer carriage comprises a vertically moveable passive elevator. The passive elevator reduces system failures and improves the flexibility and simplicity of the system because no electrical signals need be routed to the passive transfer carriage.

It is another aspect of the present invention to include an active transfer carriage which moves media elements in a first direction, and wherein the passive transfer carriage mentioned above moves media elements in a second direction, and wherein the active transfer carriage conveys media elements to the passive transfer carriage. In this way, such media elements can be transferred from a first location to a second location in a data storage and retrieval system. In a preferred embodiment the active transfer carriage comprises a picker and the media element comprises a notch. In this embodiment the picker is moveable to engage the notch and to thereby push the media element into the passive transfer carriage and to extract the media element from the passive transfer carriage.

The picker of the present invention is a much simpler mechanism than those provided by the prior art for accomplishing the same task. No articulation or rotational motion is required in order for the apparatus of the present invention to engage the notch or manipulate the media element to move it from one location to another in the system. In a preferred embodiment of the present invention the picker engages the notch on the media element by being displaced through movement of the active transfer carriage after the picker has first been extended substantially linearly toward the notch.

In one preferred embodiment of the present invention, the media elements are stored in a rack having a plurality of media element receptacles. The receptacles preferably include a biasing member adjacent to one side of the receptacles such that the media element is forced to an opposite side of the receptacle, thereby rendering the notch more accessible to the picker when the media element is fully inserted into the receptacle.

It is another aspect of the present invention that media element readers in the data storage and retrieval system are actuated by an inexpensive and simple automated mechanism. In some prior art systems, costly additional motor drive actuators are used. By contrast, in one embodiment of the present invention, an actuation arm is coupled to a drive engagement lever integral to the drive such that lever arm rotation actuates the drive. Also, a moveable carriage includes an extendable plunger which is adapted to engage an end of the actuation arm. In this embodiment, carriage motion causes the actuation arm to rotate when the plunger is engaged to the actuation arm, thereby actuating the drive after a media element is installed. This embodiment of the invention is especially suitable for DLT format tape drives, as they include an actuation shaft attached to the engagement lever which may be coupled to the actuation arm described above.

The present invention further includes methods of transferring media elements from a first location to second location within a data storage and retrieval system. The methods may comprise the steps of (1) transferring a media element from a storage location into a moveable active transfer carriage, (2) transferring the media element to a moveable passive transfer carriage, and then (3) transferring the media element to a second moveable active transfer carriage which ferries the media element to a second location.

Also provided are methods for transferring media elements from a storage location to a moveable active transfer carriage. Preferably, the media element comprises a notch and the moveable active transfer carriage comprises an extendable picker adapted to engage the notch. In this embodiment, the picker is first extended longitudinally toward the notch until one end of the picker is adjacent to the notch. Then, the picker is moved laterally toward the notch until the picker engages the notch, and the media element is pulled into the active transfer carriage by longitudinally retracting the picker.

A drive actuation method is also disclosed. In one embodiment, an actuation arm is coupled to an engagement lever such that rotation of the actuation arm rotates the engagement lever. Another end of the actuation arm is then preferably coupled to a moveable carriage, whereby carriage motion rotates the actuation arm to rotate the engagement lever actuates the media element reader.

BRIEF DESCRIPTION OF THE DRAWINGS

FIG. 9b illustrates a perspective view of the actuation arm which is coupled to the media element reader of FIG. 9a.

FIG. 9c illustrates a cutaway view of the coupling of the drive actuation shaft and lever along line 9c—9c of FIG. 9a.

DETAILED DESCRIPTION OF THE PREFERRED EMBODIMENT

The present invention is described herein with reference to the accompanying Figures, where like numerals refer to like elements throughout. The present invention is a data storage and retrieval system for a computer, wherein the storage and retrieval system is designed for the automatic selection, retrieval and loading of media elements into appropriate media element readers. Many types of media elements are currently utilized for computer data storage. These include optical disks, as well as various forms of magnetic media such magnetic disks or tape. Many different packaging formats are available for the various media types, and additional media formats will surely be developed in the future. The term "media element" is therefore intended to denote any physical substrate suitable for encoding large amounts of data required by a computer system. A media element reader is therefore the reader or "drive" associated with a specific media element, and which translates the data stored on a media element into electrical signals communicated to the computer system.

Various aspects of the present invention have been found to be especially suitable for use with certain magnetic tape cartridges and drives. The preferred embodiment of the invention described below accordingly involves a media element commonly known as the "DLT" tape cartridge, which was developed by Digital Equipment Corporation. Those of skill in the art will readily appreciate, however, that the invention described below has broad application to many other embodiments of computer data storage and retrieval libraries.

The Modular Cabinet

Figure 1:
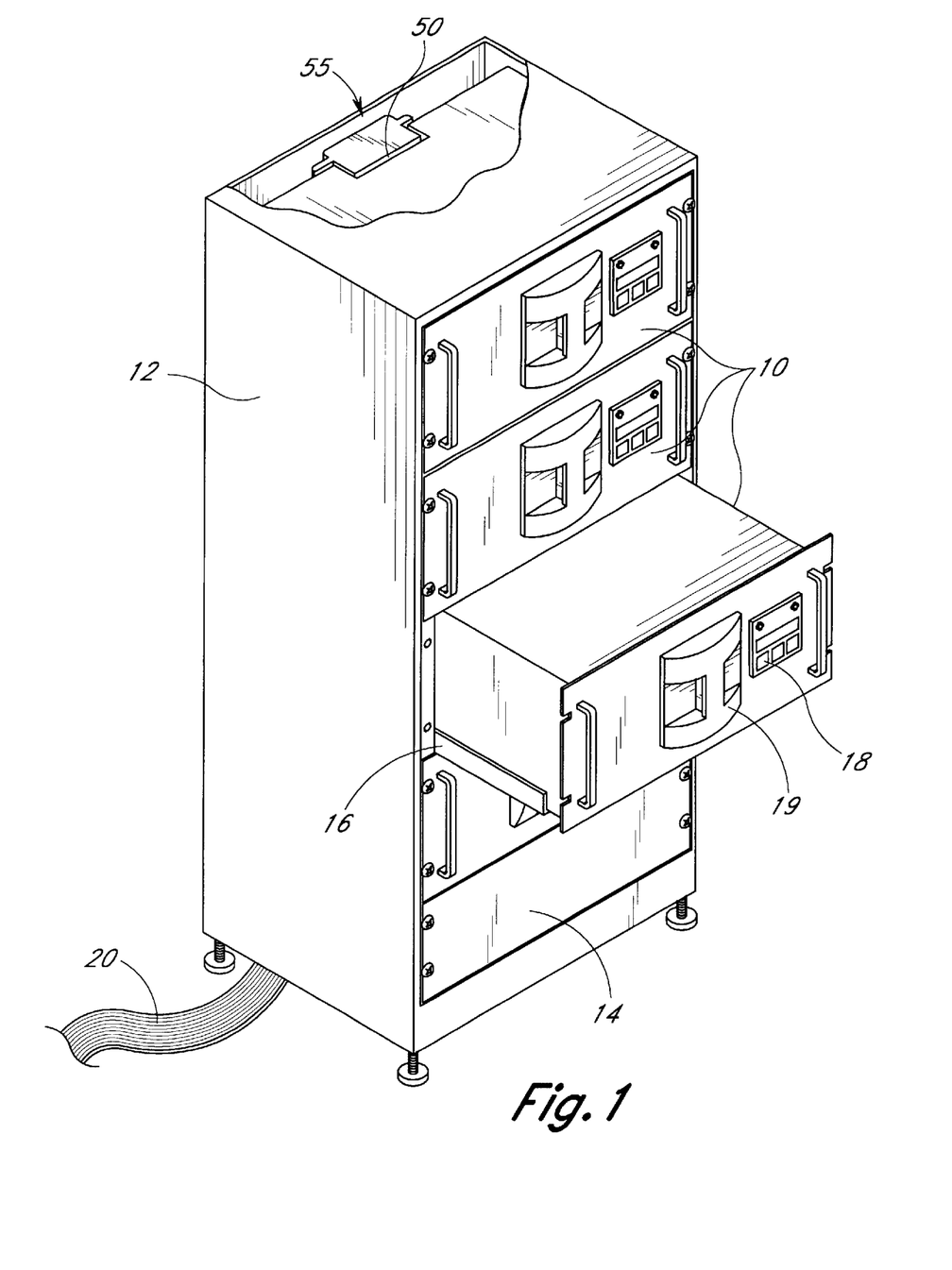
FIG. 1 is a perspective view of a modular data storage and retrieval system according to the present invention with a single module partially removed from the cabinet.

The preferred modular cabinet for storage and retrieval of magnetic data tape cartridges preferably comprises an upright, rectangular cabinet into which several individual modules can be inserted and supported in a vertically stacked arrangement. FIG. 1 illustrates a preferred storage and retrieval system according to the present invention. The system comprises a plurality of modules 10, each of which houses tapes, tape drives, or a combination of the two, supported in a vertically stacked arrangement by a surrounding upright cabinet or rack 12. The rack is preferably an EIA standard RS-310-C style, and is provided with support slides 16 for each of the modules in a manner well known in the art. The cabinet also preferably comprises a hinged rear panel forming a rear door.

Located preferably at the bottom of the cabinet 12 is a control unit 14, which communicates with the host computer system via cabling 20 which exits the system through the floor of the cabinet 12. The control unit 14 also controls the operation of the modules 10 in the cabinet 12 so as to transfer files between the host computer system and the storage media in the cabinet 12.

Each module 10 preferably includes a front panel display 18 for displaying error codes, drive activity, etc. The front panel display 18 may also include some manually operated control features such as a hardware reset, self-test, and the like as is common practice in the art. The front panel of each module 10 also preferably allows front panel access to the tape cartridges stored inside the module 10. Most preferably, a handle 19 is accessible on the front panel, and is attached to a rack of tape cartridges which is inside the enclosure 10. In this embodiment, a tape cartridge rack can be made to slide out of the front of the module 10 for service or for exchanging the particular tapes provided within that module 10.

Figure 2A:
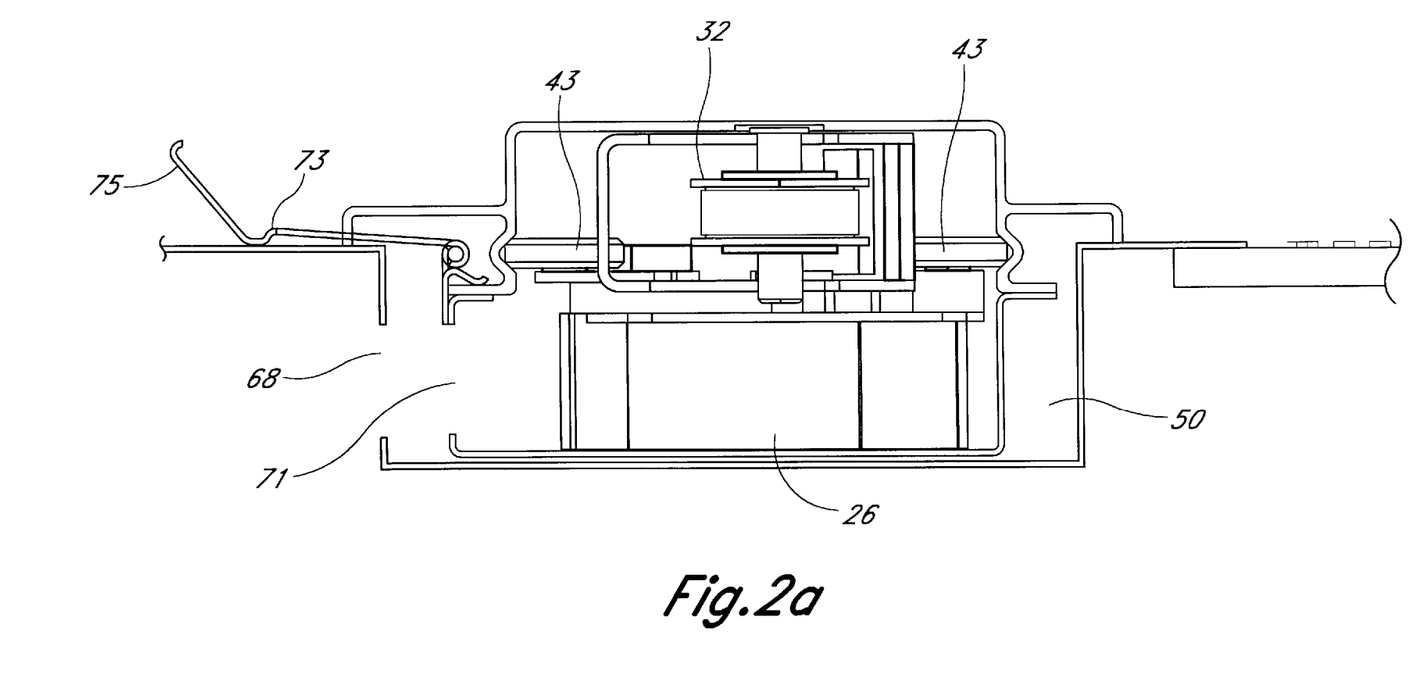
FIG. 2a is a top cutaway plan view of the transfer conduit of FIG. 1.

In a preferred embodiment as shown in FIG. 1, the rear of each module 10 and the control unit 14 is configured to form a central vertical channel 50. A vertical stack of modules 10 installed into a cabinet will thereby form a continuous U-shaped channel 50 along their entire height. Within this channel 50 is a transfer conduit 55 which houses a vertically moveable passive transfer carriage 26, which is described in detail in conjunction with FIG. 3. In FIG. 2a, a top cutaway view of the transfer conduit 55 is shown, illustrating the passive transfer carriage 26 inside. Preferably, the passive transfer carriage 26 is provided with integral rollers 43, which during operation are seated in vertical channels in the conduit 55 side walls.

Figure 2B:
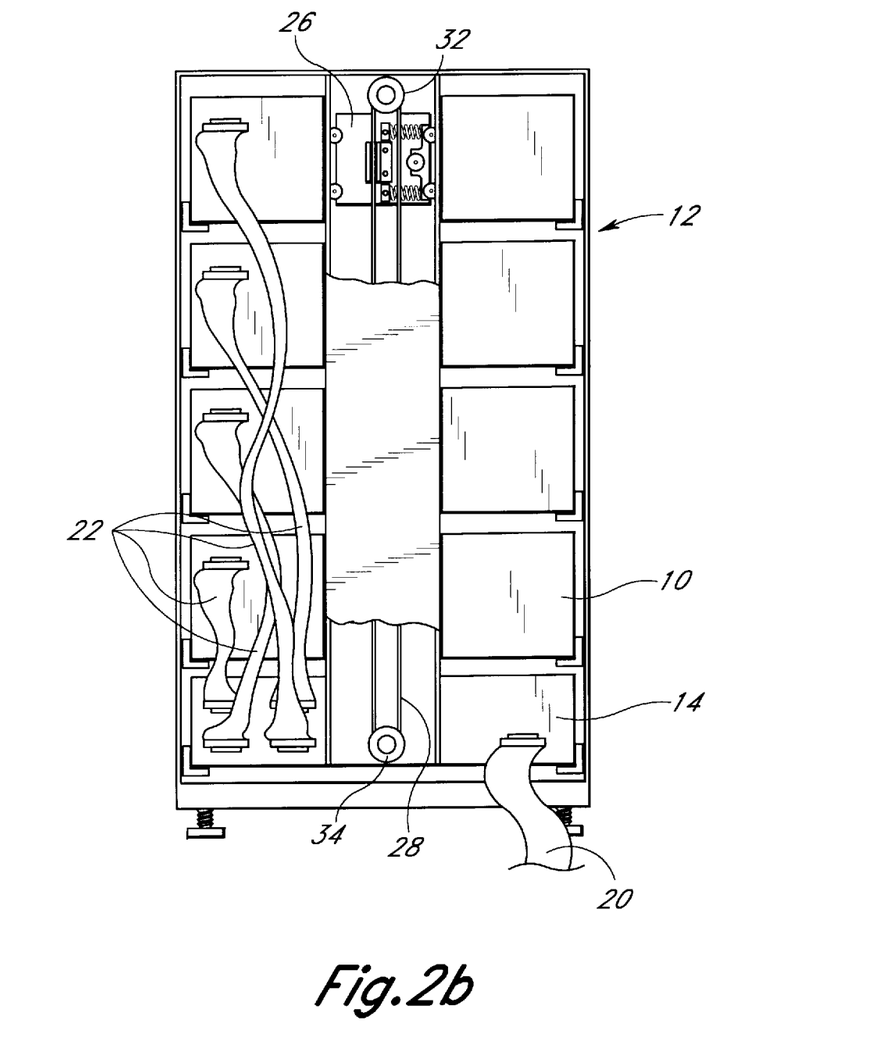
FIG. 2b is a rear elevation and partial cutaway view of the modular cabinet system of FIG. 1 with the rear door of the cabinet open.

Referring now also to FIG. 2b, vertical motion of the carriage 26 is preferably produced by the scrolling action of a drive belt 28, to which the passive transfer carriage 26 is fixed. The drive belt 28 is mounted on a bottom drive pulley 34 with axle affixed to the shaft of a dc servo motor which protrudes from the rear panel of the control unit 14 at the bottom of the cabinet 12. At the top, the drive belt 28 is mounted to an idler pulley 32 affixed to a bracket inside the transfer conduit 55. Rotation of the dc servo motor mounted inside the control unit 14 therefore produces vertical motion of the passive transfer carriage 26. Furthermore, the control unit 14 on the bottom of the cabinet 12 communicates independently with each module via internal cabling 22.

For illustrative purposes, the brackets which mount the drive pulley 34 and the idler pulley 32 are not shown. Preferably, the drive pulley has an axle fixed with respect to the pulley 34, wherein the axle rests in bearings mounted in brackets which extend up from the bottom panel of the transfer conduit 55. The idler pulley 32 preferably is attached to its axle on a central bearing, and the ends of the axle rest in slots in a bracket which extends downward from the top panel of the transfer conduit. Belt tension is preferably provided by a spring loaded cam which pushes the axle of the idler pulley 32 upward in the bracket slots until the belt has the appropriate tension. Of course, many different vertical drive arrangements, belt and pulley configurations, etc. for providing vertical motion of such a transfer carriage will be readily apparent to those of skill in the art.

Communication between the modules 10 and the passive transfer carriage 26 is provided by a pass through slot 68 in the rear panel of each module 10. These openings in the modules 10 are configured to be in alignment with corresponding openings 71 in the transfer conduit 55. These openings allow for the passing of media elements (DLT tapes in a preferred embodiment shown in the Figures) out of the modules 10 and into the passive transfer carriage 26. After moving to a new module 10, the media element stored in the passive transfer carriage is extracted, and enters the other module through the pass through slot 68 in the rear panel of the other module.

In a preferred embodiment of the present invention, the transfer conduit 55 is segmented into several sections. The top panel incorporates the idler pulley 32 and its associated securing bracket, as described above. The bottom section incorporates the belt drive pulley 30 and extends upward such that two pass through openings 71 are included. The smallest system according to the present invention therefore comprises this bottom section of the transfer conduit 55 with the top section of the transfer conduit attached directly onto the top of the bottom section and includes two modules 10, each communicating with one of the pass through openings. If a system user wishes to expand their system to include an additional module, the top panel of the conduit 55 incorporating the idler pulley 32 is removed, and an additional conduit 55 segment having height approximately equal to the height of a module 10 and incorporating one pass through opening 71 is affixed on top of the above described bottom section, thereby extending the height of the conduit. The top panel with its associated idler pully is then reinstalled onto the top of the added segment to cap the whole conduit 55. Further provided, of course, is a longer belt to span the now longer distance between the drive pulley 30 and the idler pulley 32. In this way, the system is easily vertically expandable to include additional modules.

It is one aspect of the present invention that a hinged cover 73 is included for each opening 71 in the transfer conduit. The cover 73 is configured such that it is normally held closed by a spring in the hinge, but is held open if a module 10 is installed in the cabinet 12 adjacent to the cover 73 and opening 71 as is shown in FIG. 2a. The cover 73 is provided with a protruding tab section 75, which extends diagonally outward from the front corner of the conduit 55 when the cover 73 is closed. Therefore, when a module 10 is removed from the cabinet 12, the cover 73 is forced closed by the spring. When the removed module 10 is re-installed into the cabinet 12, the rear panel of the module pushes against the protruding tab section 75 of the cover 73, thereby forcing the cover 73 open, and allowing the pass through slot 68 in the module 10 to communicate with the opening 71 in the transfer conduit 55. This helps prevent warm air which is in the rear area of the cabinet 12 from entering the transfer conduit 55 through an opening 71, and thereby also entering an adjacent module 10 through its pass through slot 68.

Figure 3:
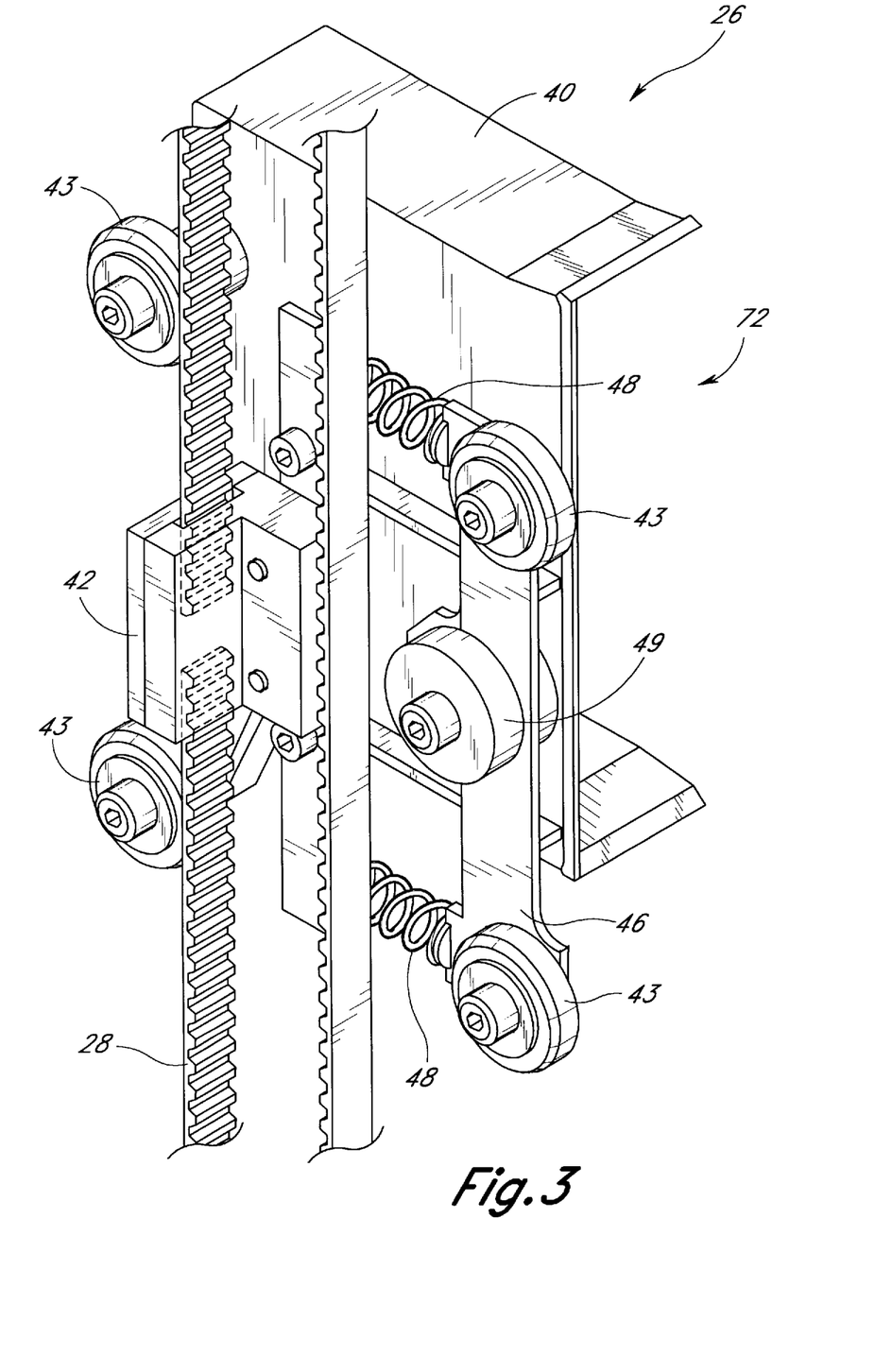
FIG. 3 is a perspective view of the passive transfer carriage illustrated in FIGS. 2a and 2b.

FIG. 3 illustrates a preferred embodiment of the passive transfer carriage of the present invention. In this context "passive" is intended to mean that it does not include any electrically actuated elements for pushing, pulling, grabbing, or otherwise manipulating a tape cartridge. Of course, the carriage 26 moves up and down via the action of the drive belt 28, but insertion and extraction of tape cartridges from the passive transfer carriage 26 is performed by elements housed inside the modules 10 and which are described in detail below. The passive nature of this carriage 26 provides several benefits. First, no wiring need be routed to the carriage 26. This eliminates one source of library system failure by eliminating wire fatigue associated with the electrical connection between a stationary control circuit and a moving carriage. Furthermore, cabinets of varying height can be made by simply altering the length of the drive belt 28, without the need to alter any associated wiring harness.

As can be seen in FIG. 3, the passive transfer carriage 26 preferably comprises a "C" shaped plastic or metal housing 40, sized to slidably fit a tape cartridge. It preferably has no moving parts and requires no electrical connection to any control circuit. The passive transfer carriage 26 is fixed to each end of a cut drive belt 28 by a clamp 42 affixed to the carriage 26 back. The carriage 26 is also preferably provided with two pairs of rollers 43 on each end, which ride in the conduit 55 channels mentioned above with reference to FIG. 2a. Preferably, the rollers on one end are solidly fixed to the carriage housing 40, and the rollers on the other end are fixed to a bracket 46, which is movably coupled to the cartridge housing 40 with springs 48 and coupler 49. This allows easy installation of the rollers 43 into the vertical channels in the conduit 55 and allows some play in the roller mechanism to allow proper function even in the presence of imperfections in the conduit 55 and its vertical channels in which the rollers 43 are seated. Of course, those of skill in the art can devise many other ways of providing the controlled vertical motion of the passive transfer carriage 26 without undue experimentation.

It is preferable also to provide a mechanism whereby the controller 14 can determine the presence and position of each individual module 10 in the cabinet 12. This can be accomplished in many ways. In one embodiment, the transfer carriage 26 is provided with a flag (not shown in Figures) which extends from the housing. The flag may be situated such that as the carriage 26 moves up and down the flag passes through sensors provided on the rear of each module 10, and which extend into the transfer conduit 55 through holes in the conduit 55 wall. Such sensors will preferably comprises an LED spaced apart from a light sensor in a "U" configuration as is well known to those in the art. When the flag passes through the "U", the light path between the LED and the light sensor is temporarily blocked, providing a signal to each module 10 indicating that the carriage 26 has passed. Alternatively, the flag may comprise a reflective surface, and the reflectivity may be sensed as the flag passes an opening in the conduit 55 adjacent to which a combination LED/light sensor is placed on each module 10. Other mechanisms which are known in the art may also be used, such as Hall effect sensors. This sensor 46 signal may further be passed to the control unit 14 to allow precise carriage 26 control. The control unit 14 may also thereby monitor the presence or absence of a module 10 at a particular location in the cabinet.

Figure 4A:
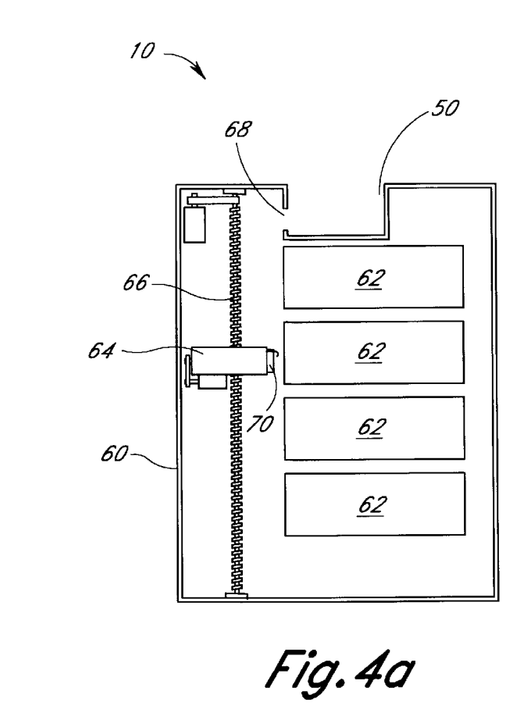
FIG. 4a is a top plan view of a single module containing tape drives and an active transfer carriage.
Figure 4B:
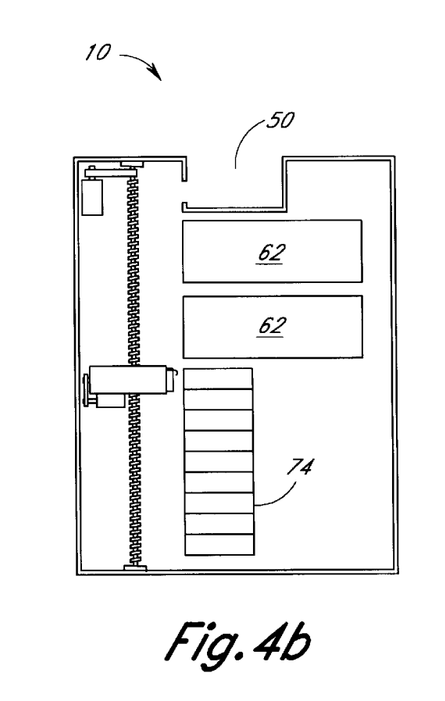
FIG. 4b is a top plan view of a single module containing both tape cartridges, tape drives, and an active transfer carriage.
Figure 4C:
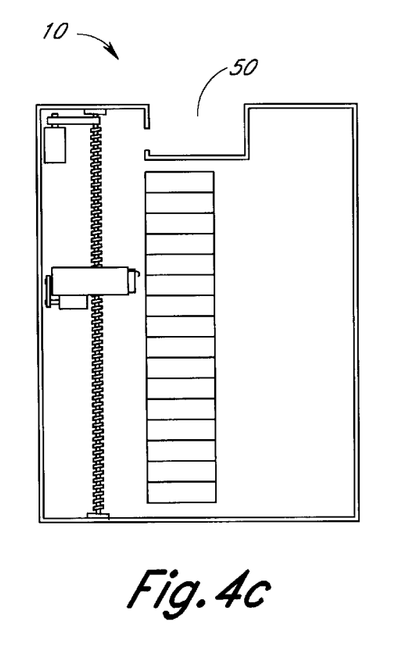
FIG. 4c is a top plan view of a single module containing tape cartridges and an active transfer carriage, but no tape drives.

FIGS. 4a, 4b, and 4c further illustrate top plan views of several alternative preferred internal configurations of module 10. As was mentioned above, preferred modules 10 may contain only tape drives, as shown in FIG. 4a, only tape cartridges, as is shown in FIG. 4c, or a combination of the two, as is shown in FIG. 4b. It is one aspect of the present invention that each preferred module includes the rear channel 50, and therefore various combinations of internal module 10 configuration may be provided in a single cabinet 12. This feature provides the benefit of reduced average seek time between a request for a file from a host computer and its retrieval because in those cases where the required tape is in a module 10 housing a tape drive, the tape need not be routed out of the module 10 to an external drive. Prior art library systems having separate media element storage modules and media element readers must always route a media element to an external drive for reading. Furthermore, media element readers and media elements can be separately added according to a user's needs. Prior art systems which comprise racks of independent modules containing both media elements and media element readers are less flexible and do not allow independent additions to these two basic library subunits. As illustrated in FIG. 1, the modules 10 are preferably slidably mounted to the cabinet 12, permitting easy access to the contents of the modules 10 by the user of the system. The storage and retrieval capacity of the modular system can be increased by adding storage modules within a single cabinet, and by adding cabinets to house additional modules. The modules 10 themselves will now be described in detail.

The Modules

As explained above, the general internal layouts of several alternative preferred modules 10 according to the present invention are illustrated in FIGS. 4a, 4b, and 4c. In FIG. 4a, a module 10 is illustrated which comprises a housing 60 which encloses a plurality of tape drives 62.

Also included in the module 10 of FIG. 4a is an active transfer carriage 64, also termed a "shuttle". The active carriage 64 operates to ferry tape cartridges along a threaded drive shaft 66 which runs adjacent to the front of the plurality of drives 62, and which also runs adjacent to a pass through slot 68. The pass through slot 68 is in the side of the channel 50 so as to provide communication between an end 70 of the internal active transfer carriage 64 and an end 72 of the external passive transfer carriage 26 when both are situated adjacent to the pass through slot 68.

FIGS. 4b and 4c may now be readily understood as modifications to the layout illustrated in FIG. 4a. FIG. 4b illustrates a module 10 layout which includes the active transfer carriage 64 and tape drives 62 similar to FIG. 4a, but which also includes a rack 74 which provides a plurality of receptacles for storing a plurality of tape cartridges. FIG. 4c illustrates a preferred internal layout of a module 10 which houses only the active transfer carriage 64 and a rack 74 for housing a plurality of tape cartridges. Many various internal module configurations are possible and will be apparent to those of skill in the art. For example, a module containing only tape cartridges may utilize a rotating circular carousel of cartridge storage receptacles rather than a linear rack of cartridge receptacles. In this embodiment, the carriage 64 could be configured to rotate into position adjacent to the pass through slot 68 after pulling a tape from the carousel rather than being configured to move linearly past a rack of cartridge receptacles.

Figure 5:
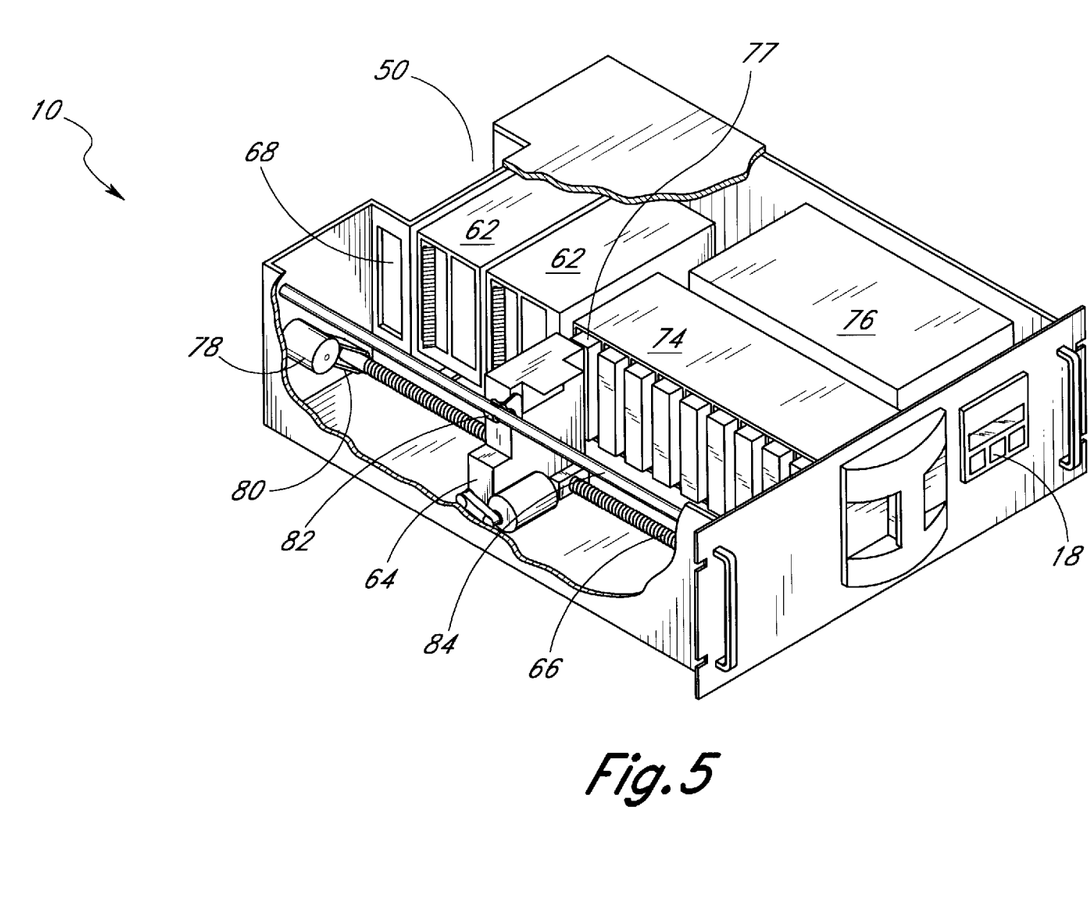
FIG. 5 is a cutaway perspective view of a single module as shown in FIG. 4b.

FIG. 5 illustrates a more detailed cutaway view of a preferred module 10 incorporating both tape drives 62 and a tape rack 74 with internal layout as illustrated in FIG. 4b. Further provided inside module 10 is a power supply as well as motor drive and I/O circuitry 76, all of which is well known to those of skill in the art. If desired, handles can be attached to the tops of the drives 62 for easier removal and installation during servicing.

The active transfer carriage 64 is threadably secured to the drive shaft 66, which is in turn secured just above the floor of the module 10 in bearings on the front and rear panels of the module 10. Carriage 64 motion is produced by a motor 78 which is secured to the inside of the module 10 housing, and which has a rotor coupled to the threaded drive shaft 66 by a drive belt 80. The top of the transfer carriage 64 is preferably provided with a substantially "U" shaped stabilizing brace 82 which is slidably coupled to a second non-threaded stationary shaft 84 which runs from the front panel to the rear panel of the module 10 parallel to but spaced away from the threaded shaft 66 on which the carriage is mounted. The stationary shaft 84 and stabilizing brace 82 prevent the carriage 64 from rotating when the drive shaft 66 to which it is coupled rotates.

It can be appreciated from FIG. 5 that as the active transfer carriage 64 moves from the rear of the module 10 to the front (also referred to herein as from the left to the right), it begins with one end 70 adjacent to the pass through slot 68. As it moves along the drive shaft 66 toward the front of the module 10, the same end 70 sequentially moves past the fronts of the tape drives 62 and the fronts of the tape receptacles of the tape storage rack 74. The operation of the active transfer cartridge 64 is described in detail in the next section with reference to FIG. 6.

Overall operation of the module 10 as a whole proceeds as follows. Upon the receipt of commands from the control unit 14, driver circuitry 76 positions the active transfer carriage 64 in front of a particular tape cartridge 77 in the rack 74. The carriage 64 pulls the tape cartridge 77 from the rack 74 into its own housing, and then travels toward the rear of the module 10. It may stop adjacent to one of the drives 62, or it may continue rearward until it is adjacent to the pass through slot 68.

If the carriage 64 stops adjacent to a drive 62, the active transfer carriage 64 pushes the tape cartridge out of its housing and into the drive 62. As will be explained in detail below with regard to FIGS. 8 and 9a–9e, the active transfer cartridge is further provided with a drive actuation mechanism to activate the drive 62 after a tape cartridge is installed. If the carriage 64 travels to the pass through slot 68, the controller unit 14 will have previously sent the passive transfer carriage 26 into alignment externally with the same pass through slot 68 in the module 10. In this case, the active transfer carriage 64 pushes the tape cartridge 77 into the passive transfer carriage 26 in a manner analogous to that used to push the tape cartridge 77 into a drive 62. The passive transfer carriage 26 may then ferry the cartridge 77 to a different module 10 of the library, where it is pulled in by the active transfer carriage 64 of that other module in a manner analogous to that utilized when pulling the cartridge 77 out of the storage rack 74.

It can readily be appreciated that in a preferred embodiment of the present invention a tape cartridge 77 may be transferred from one rack 74 to another, as well as installed into a tape drive 62 which may be in a different module 10 from the one in which the tape cartridge 77 was initially stored. It can also be appreciated that the storage and retrieval system described may operate normally with one or more of the modules 10 removed from the cabinet 12 because the passive transfer carriage 26 may still move up and down to those modules 10 which remain.

The Active Transfer Carriage

Figure 6:
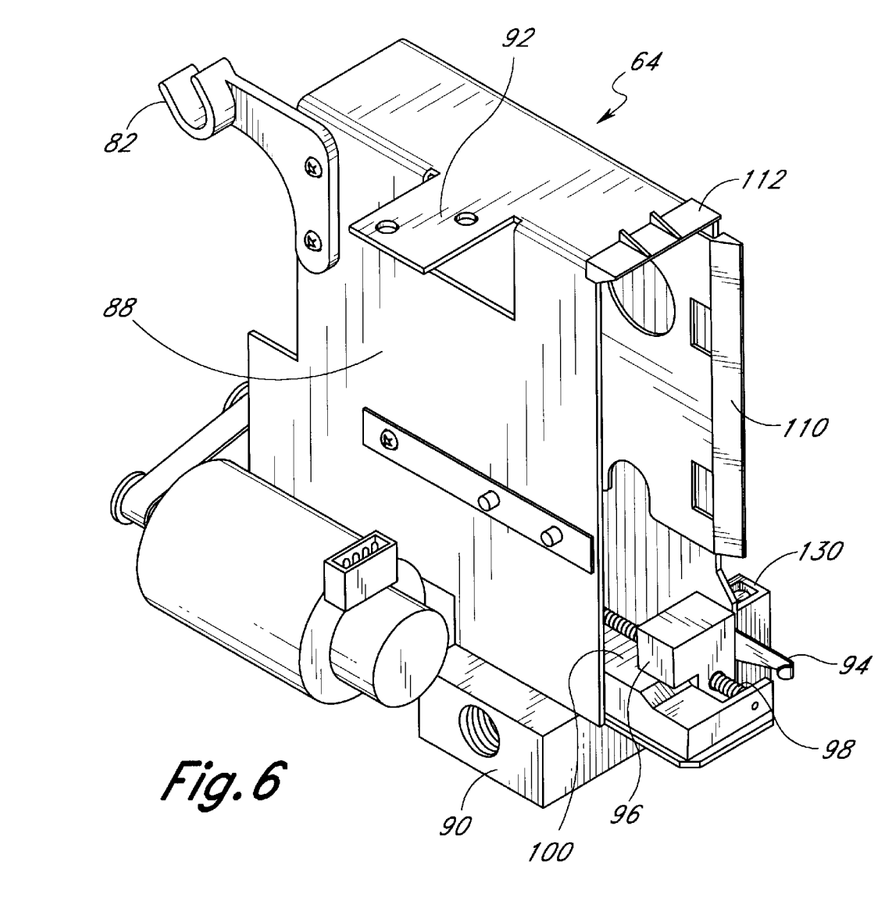
FIG. 6 is a detailed perspective view of the active transfer carriage of the present invention.

A preferred embodiment of the active transfer carriage 64 is illustrated in FIG. 6. A preferred active transfer carriage 64 comprises a hollow housing 88 with rectangular cross section which may be formed from either plastic or sheet metal. As was described above with respect to FIG. 5, a stabilizing brace 82 is affixed to the housing to prevent carriage rotation during operation. The carriage 64 is also preferably provided with a bracket 92 for mounting a bar code reader. If a bar code label is placed on the front of the tape cartridges, the bar code reader can be utilized to identify specific cartridges and ensure that the correct tape cartridge is being transported.

The carriage 64 is threadably mounted onto the drive shaft 66 with a tapped rectangular plastic block 90 which is affixed to the bottom side of the carriage. It can be seen therefore that rotation of the drive shaft 66 will cause lateral motion of the carriage 64 along the shaft 66 due to the threaded coupling through the plastic block 90.

Also provided in accordance with the present invention is a longitudinally extendable and retractable picker 94 which is preferably hook shaped and operates to engage a notch on the side of a tape cartridge. The picker 94 is utilized to pull the cartridge into the carriage housing 88 or push the cartridge out of the housing 88 and into a drive 62, into a storage location, or through the pass through slot 68 and into the passive transfer carriage 26. The picker 94 is affixed to a plastic block 96 which is tapped in a manner similar to the plastic block 90 affixed to the carriage bottom. The plastic block 96 is threaded onto another threaded drive shaft 98 which is mounted in bearings at the front and rear of the carriage housing 88. The picker drive shaft 98 extends along a lower internal corner of the housing 88 recessed below the housing floor 100.

Figure 7A:
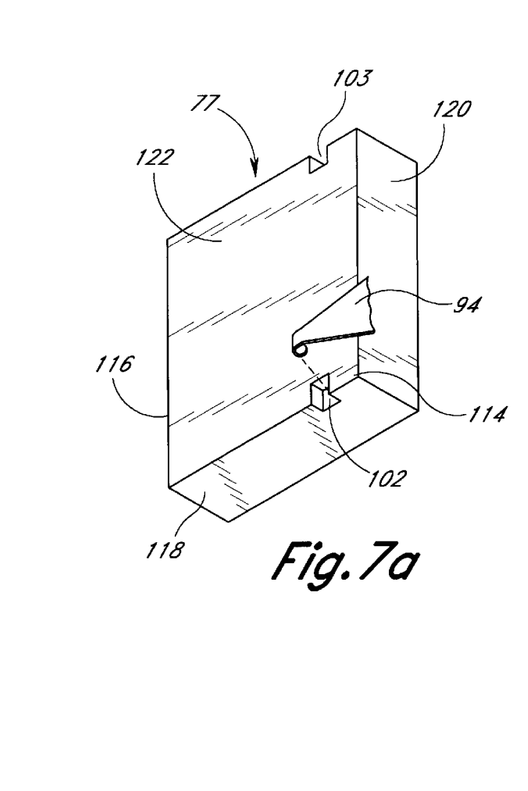
FIG. 7a is a perspective view of a magnetic tape cartridge suitable for use with the present invention and the picker portion of the active transfer carriage of FIG. 6.
Figure 7B:
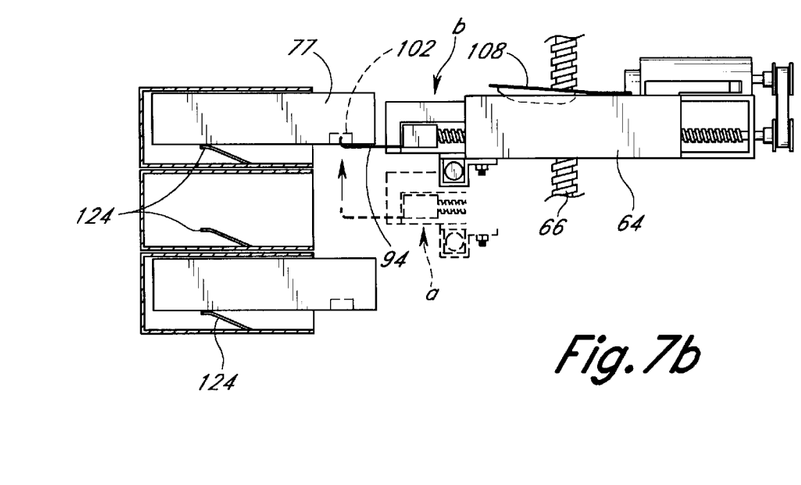
FIG. 7b is a top plan view of the active transfer carriage of FIG. 6 during the tape cartridge extraction operation.
Figure 7C:
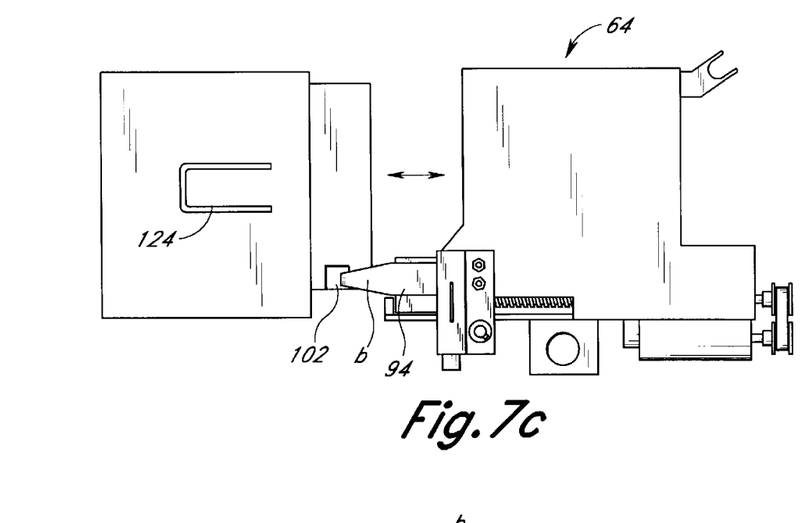
FIG. 7c is a side elevation view of the active transfer carriage of FIG. 6 during the tape cartridge extraction operation.

Referring now to FIGS. 7a, 7b and 7c in addition to FIG. 6, the operation of the picker portion 94 of the active transfer carriage 64 may now be explained. FIG. 7a illustrates a tape cartridge 77 which is especially suited for use with the data storage and retrieval system of the present invention. The tape cartridge 77 is generally rectangular in shape, and incorporates a notch 102 which is disposed along one edge of the cartridge 77 at the juncture of two of its sides, and proximate to a corner 114 which is opposite from the cartridge end 116 which is intended to be first inserted into a tape drive 62 entry door for reading. In some commercially available tape cartridges, a second notch 103 is provided along the opposite edge of same cartridge 77 face, also proximate to a corner which is opposite from the cartridge end 116 which is intended to be first inserted into the tape drive 62 entry door. In a preferred module 10, the tape cartridges are placed in the tape cartridge storage rack 74 such that the notch 102 is disposed toward the bottom front of the storage rack 74, with the cartridge end face 116 toward the rear of the storage rack 74. Furthermore, the tape drives 62 are oriented such that the proper orientation for inserting the tape cartridge 77 into the drive 62 is face 116 first, and face 118 on the bottom. In a preferred system therefore, tape cartridges are stored, transferred, and installed into tape drives in an edgewise orientation with the notch 102 on the bottom, and that orientation is preferably not modified by any tape cartridge manipulation by the system.

It can be appreciated that in order to engage the notch 102, the picker 94 must be extended outward toward the cartridge 77 with the active transfer carriage 64 displaced slightly to the side of the notch 102. Otherwise, the picker 94 will simply hit the front face 120 of the cartridge 77 when it is extended outward. Referring especially now to FIGS. 7b and 7c, tape cartridge transfer within a module 10 is accomplished as follows.

First, the active transfer carriage 64 is positioned along drive shaft 66 such that the picker 94 is situated just to the left of the cartridge edge which includes the notch 102. The picker is then extended outward along its threaded drive shaft 98 until the hook portion of the picker 94 is adjacent to the notch 102. For illustrative purposes, this is shown as position a of FIG. 7b, however, the central tape cartridge of the illustrated tape cartridge rack is not shown in FIG. 7b, and carriage position a is illustrated farther away from the notch 102 than is the case in normal operation. The picker normally extends outward very close to the notch 102, and just fits in between adjacent cartridges.

Following this extension, the transfer carriage is moved to the right along drive shaft 66 until the picker 94 engages the notch 102, shown in FIGS. 7b and 7c as position b. The picker 94 is then retracted back into the housing 88 of the active transfer carriage 64 along its drive shaft 98, thereby pulling the cartridge 77 into the carriage 64. After the cartridge 77 is inside the carriage housing 88, the carriage can be moved along the drive shaft 66 either to an internal tape drive 62, or to the pass through slot 68. If the carriage 77 is moved to the pass through slot 68, the above described rack extraction steps are reversed, and the cartridge 77 is inserted into the passive transfer carriage 26 in the same manner as a cartridge 77 would be replaced into a receptacle of the rack 74. If the cartridge is to be placed in an internal drive 62, the above rack extraction steps are also reversed, but an additional push is preferably given to the face 120 of the cartridge 77 with the front end of the picker 94. Therefore, when a cartridge is installed into a drive 62, the picker 94, which is still engaged to the notch 102, is extended and pushes the appropriate end face 116 into the drive 62. When the picker is fully extended, the transfer carriage 64 is moved slightly to the left along drive shaft 66, disengaging the picker 94 from the notch 102. The picker 94 is then retracted, and the transfer carriage 64 is moved slightly to the right, such that the front end of the picker 94 will contact the front face 120 of the cartridge if it were extended outward again. When in this position, the picker 94 is extended outward once again until it does contact the front face 120 of the cartridge 77 and pushes the cartridge 77 into the drive 62 to ensure that it is fully seated within.

Several additional features of the rack 74 and the active transfer carriage 64 are preferably provided to help insure smooth operation in the extraction and insertion operations. The carriage housing 88 may be provided with angled top and side guide flanges 110, 112 which help align the tape cartridges with the housing 88 of the carriage 64 as they are pulled inward by the picker 94. Furthermore, a flexible biasing member 108 may be provided in the housing 88 wall opposite the wall adjacent to the picker 94. This keeps the notch on a tape cartridge forced over the picker, and helps prevent the picker 94 from slipping out of the notch while the cartridge 77 is being pulled into or pushed out of the housing 88.

Another flexible biasing member 124 is preferably provided in each rack 74 receptacle in the wall adjacent to the face 122 of the cartridge 77 which incorporates the notch 102. The biasing member is preferably integral to the receptacle wall itself, and can be made by forming a flexible tab from the side wall itself by cutting three sides of a rectangle into the receptacle wall, and bending the resulting rectangular tab, which is still connected to the receptacle wall along one edge, slightly into the receptacle storage area. This biasing member 124 holds the tape cartridge 77 against the opposite wall of the receptacle, and ensures that there is sufficient space between the cartridges to insert the picker between cartridges and to engage the picker 94 with the notch 102 when the cartridge 77 is fully inserted into the rack 74.

It is well known that many media element readers require actuation by lever arm rotation or other mechanical action. This mechanical actuation typically couples the internal drive motors to the media elements so that they can be spun, de-spooled, or otherwise manipulated during the reading and writing processes. Although this mechanical action is typically performed manually by the user, automated data storage and retrieval libraries must actuate media element readers without user interaction. It is one aspect of the present invention that reader actuation may easily be performed for those media elements having an actuation shaft accessible from the outside of the reader enclosure. In media element readers which are especially suitable for use with the present invention, reader actuation may be accomplished by an approximately 60–70 degree rotation of a shaft having a D-shaped end, wherein the D-shaped end of the shaft is accessible external to the reader enclosure. Most preferable for use with the present invention are DLT tape drives. These drives read tapes which incorporate the notch 102 as described above. They also incorporate a D-shaped shaft for drive actuation. Furthermore, when such tape drives are oriented as described above for tape cartridge 77 insertion with cartridge face 116 entering first and face 118 on the bottom, the actuation shaft extends downward from the bottom face of the drive, is disposed near the front of the drive, and is approximately centrally located. It can be appreciated that an actuation lever arm may be coupled to the D-shaped shaft. If this actuation lever arm/shaft combination is configured such that the lever arm axis is perpendicular to the axis of the D-shaped shaft and the lever arm extends horizontally outward from the front of the drive 62, lever arm rotation will be operative to actuate the drive 62. In accordance with the present invention, such actuation is performed by the active transfer carriage with a plunger mechanism illustrated in detail in FIG. 8.

Figure 8:
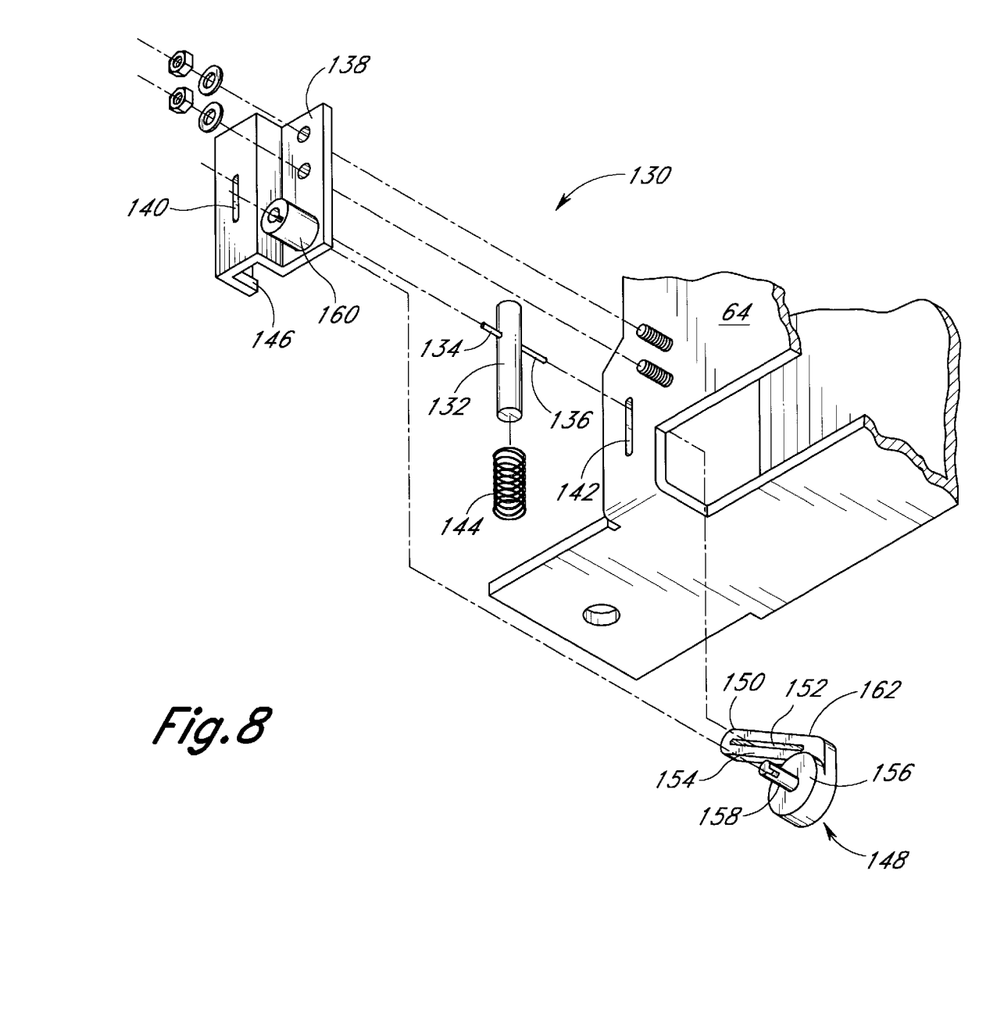
FIG. 8 is an exploded perspective view of the automated media element reader actuator of the present invention.

Referring back to FIG. 6, it can be seen that the actuator mechanism 130 is attached to the side of the active transfer carriage 64 adjacent to the picker 94, and is disposed near the front of the active transfer carriage 64. Referring now to FIG. 8, the mechanism 130 comprises a cylindrical plunger 132 which incorporates opposing integral cylindrical pins 134, 136 of a smaller diameter than the plunger. The pins 134, 136 have a common central axis which is perpendicular to and intersects the central axis of the plunger 132. The pins 134, 136 are disposed toward the top end of the plunger 132, thereby forming a cross or "t" configuration. The plunger 132 is slidably confined within a cover 138 which forms a rectangular channel with size adapted to accept the plunger 132. The cover is affixed to the wall of the transfer carriage 64 in a substantially vertical configuration, thereby trapping the plunger 132 between the cover 138 and the carriage 64, but allowing vertical motion of the plunger within the cover 138 channel. When trapped between the cover 138 and the carriage 64 wall, the opposing pins 134, 136 slidably engage two opposing slots 140, 142. One slot 140 is in the face of the cover 138, and one slot 142 is in the wall of the carriage 64. Further provided is a spring 144, with diameter slightly larger than the plunger 132. The spring 144 is placed over the lower portion of the plunger 132 with its top end in contact with the pins 134, 136. The spring 144 bottom end is held within the cover 138 by an integral flange 146 provided at the bottom end of the channel formed by the cover 138. The spring 144 pushes up on the pins 134, 136 and forces the plunger 132 upward within the cover 138 channel. However, further upward travel of the plunger 132 is prevented when the pins 134, 136 make contact with the upper end of the slots 140, 142 in which the pins 134, 136 ride. In its "at rest" configuration, therefore, the spring 144 holds the plunger 132 high in the cover 138 channel with pins 134, 136 at their upper limit within their respective slots 140, 142.

Downward motion of the plunger 132 is produced via a rotating lever member 148. The lever member 148 comprises a finger section 150 having an elongated slot 152 with smaller dimension approximately equal to the smaller dimension of the slot 140 in the cover 138 and the slot 142 in the carriage 64 wall. The lever member 148 is positioned such that one side 154 of the finger section 150 is flush against the inside of the carriage 64 wall and such that the slot 152 in the finger section 150 is adjacent to the slot 142 in the carriage 64 wall. The pin 136 which extends through the slot 142 in the carriage 64 wall is made long enough to also extend through the slot 152 in the finger section 150 of the lever member 148. In this way, the pin 136 is constrained within both slot 142 and slot 152.

The lever member 148 further comprises a body portion 156 with an integral post 158 extending from its side. The post 158 is rotatably mounted in a sleeve 160 in the cover 138. The sleeve 160 may alternatively be placed in the wall of the carriage 64, but manufacturing ease is increased when the sleeve 160 is in the cover 138. It can be seen therefore that rotation of the lever member 148 about the axis of the post 158 will cause the finger section 150 to rise and fall along the inside surface of the carriage 64 wall. Since the pin 136 of the plunger 132 is slidably mounted within the slot 152 in the finger section 150, this action will in turn cause the plunger 132 to rise and fall within the cover 138 channel. As described above, in the "at rest" position, the pin 136 is pushed to the top of slot 136. Furthermore, in this position, the finger section 150 of the lever member 148 is angled upward as shown in FIG. 8, and the pin 136 rests close to the uppermost end of the slot 152 in the finger section 150. As the lever member 148 rotates from the rest position, the angle of the finger section 150 decreases, forcing the pin 136 downward in slot 142, and toward the lowermost end of slot 152. As the plunger approaches its furthest possible downward extension, defined by the bottom ends of slots 140 and 142, the top surface 162 of the finger section 150 becomes approximately horizontal.

Figures 9A, 9D:
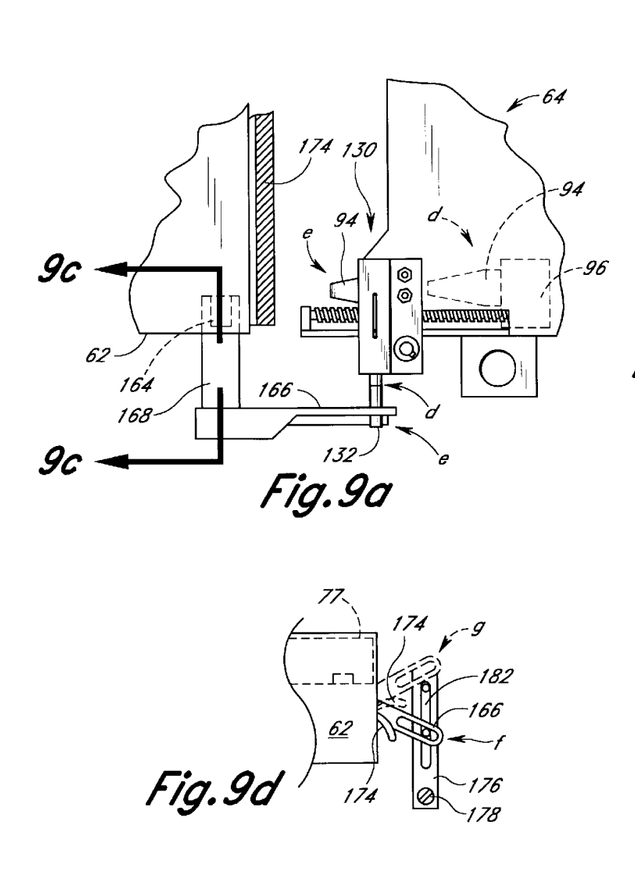
FIG. 9a is a side elevation view of a media element reader and an active transfer carriage of FIG. 6 during the reader actuation operation.
FIG. 9d illustrates a top plan view of the front portion of a media element reader coupled with the actuation arm of FIG. 9b.

Rotation of the lever member 148, and the resulting motion produced in the plunger 132 is caused by extension and retraction of the picker 94 in the following manner. FIG. 9a illustrates the picker 94, the threaded block 96 the picker is attached to, and the actuator mechanism 130. If the picker is initially in a partially retracted position, as is shown as position d of FIG. 9a, the plunger 132 is in its "at rest" position, being held high in the cover 138 channel by the spring 144. As the picker 94 is extended outward from position d towards position e of FIG. 9a, the bottom of the threaded block 96 hits the top surface 162 of the upwardly angled finger section 150 of the lever member 148. As the block 96 continues to be extended outward along its drive shaft 98, it rides over the finger section 150, forcing it downward, and thereby forcing the plunger 132 downward as well in the manner explained above. The finger section 150 becomes substantially horizontal once the picker 94 and threaded block 96 reach position e of FIG. 9a, at which point the plunger 132 has reached a maximum downward extension.

It may be noted from the illustration of position e in FIG. 9a that the plunger 132 reaches its maximum downward extension before the end of the picker 94 is extended to the front edge of the carriage 64. Of course, to engage the notch 102 the picker 94 must be capable of extending beyond the front edge of the carriage 64. During further extension of the picker 94 past position e, however, the plunger 132 simply remains forced all the way down by the contact between the bottom surface of the threaded block 96 and the top surface 162 of the lever member finger section 150.

FIG. 9a further illustrates the actuation shaft 164 which is part of the tape drive 62 and is connected to the drive engagement lever 174. Typically, the actuation shaft does not extend below the drive bottom panel, but it is accessible from outside the drive enclosure through an opening provided in the drive bottom panel. If the drive is initially engaged to a tape cartridge, the actuation shaft operates to disengage internal drive components from the installed tape cartridge when rotated about 60–70 degrees in one direction, and operates to disengage and eject an installed tape cartridge when rotated about 60–70 degrees back to its original orientation. As was described briefly above, the actuation shaft 164 preferably has a D-shaped, rather than circular, cross section.

Figure 9B:
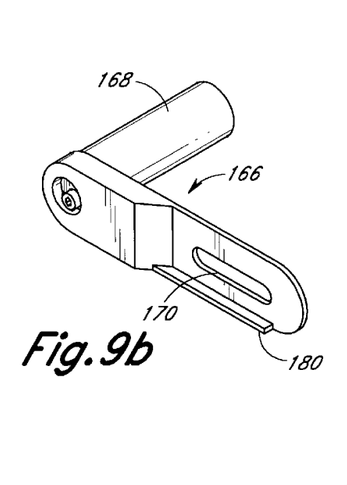

The actuation shaft 164 is coupled to an actuation arm 166 which is configured as illustrated in FIG. 9b. The actuation arm is preferably a relatively thin but rigid plastic or metal arm with a hollow cylindrical shaft coupling section 168 proximate to one end, and a lengthwise elongated slot 170 proximate to the other end. The shaft coupling section 168 is pressed over the D-shaped actuation shaft such that the actuation arm extends outward perpendicular to the shaft 164 beyond the front of the drive 62.

Figure 9C:
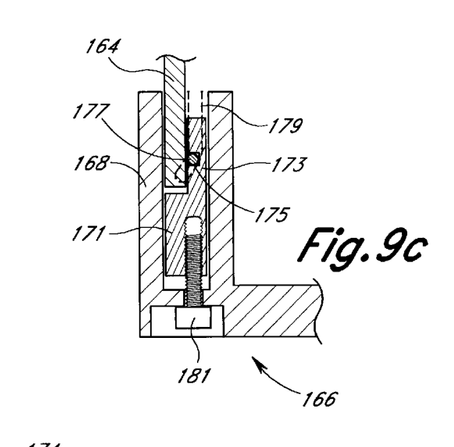

Although many securement mechanisms could be used and devised by those of skill in the art without undue experimentation, the coupling shaft 168 of actuation arm 166 is preferably fixed over the actuation shaft 164 of the drive 62 with a bottom tightened locking mechanism illustrated in FIG. 9c. Slidably inserted toward the bottom of the hollow coupling shaft 168 is a dowel with a threaded cylindrical bottom portion 171 and a D-shaped upper portion 173 which mates with the D-shaped actuation shaft 164. The D-shaped upper portion 173 of the dowel is also provided with an integral rectangular channel 175 in its flat face. Slidably engaged in this channel 175 is a locking pin 177 which has a diameter slightly larger than the depth of the channel 175.

The locking pin 177 has length such that it extends beyond the sides of the upper portion 173 of the dowel to rest in diametrically opposed angled grooves 179 which are molded into the inside surface of the coupling shaft 168. To lock the actuation arm 166 to the drive actuation shaft 164 the shaft 164 is inserted into the coupling shaft 168 of the actuation arm 166 to mate with the D-shaped upper portion 173 of the dowel. Because the ends of the locking pin 177 rest on the downwardly slanted bottom surface of the grooves 179, the pin 177 is forced tightly against the flat surface of the actuation shaft 164 as the screw 181, which is threaded into the bottom portion 171 of the dowel, is tightened and draws the dowel (and hence also the pin 177) downward into the hollow coupling shaft 168. The pressure of the locking pin 177 on the actuation shaft 164 thereby secures the actuation arm 166 to the actuation shaft 164.

Preferably, the shaft coupling section 168 is configured to attach to the actuation shaft 164 such that the actuation arm 166 extends at approximately a 22.5 degree angle from a line normal to the front face of the drive 62 when the drive is actuated. This is illustrated as position f in FIGS. 9d and 9e.

For standard DLT tape drives, cartridge ejection requires a minimum 45 degree clockwise shaft rotation (when looking at the shaft) from the actuated position. Therefore, drive ejection requires that the actuation arm 166 be moved until it is again 22.5 degrees from a line normal to the drive front face, but shifted 45 degrees from its initial position. This is illustrated as position g in FIGS. 9d and 9e. Therefore, generally lateral translation of the end of the actuation arm 166 which has the elongated slot 170 will, depending on the direction, produce either cartridge ejection from the drive 62, or drive 62 actuation after a cartridge is installed.

The complete sequence of cartridge 77 installation and drive actuation by the active transfer carriage 64 can now be understood. First, the transfer carriage 64 moves into position such that the housing 88 which contains the cartridge 77 to be installed is aligned with the drive 62 door. Because the drive 62 is empty and in an unactuated state, the actuation arm is in position g of FIG. 9d. As explained above with respect to FIGS. 7a, 7b, and 7c, the picker 94, which is still engaged to the notch 102, is extended and pushes the appropriate end face 116 into the drive 62. During this operation, the plunger 132 extends downward. However, it extends downward to the left of the actuation arm 166, in the space between positions g and f of FIG. 9c. When the picker is fully extended, the transfer carriage 64 is moved slightly to the left along drive shaft 66, disengaging the picker 94 from the notch 102. The picker 94 is then retracted, and the transfer carriage 64 is moved slightly to the right, such that the front end of the picker 94 will contact the front face 120 of the cartridge if it were extended outward again. When in this position, the picker 94 is extended outward once again until it does contact the front face 120 of the cartridge 77 and pushes the cartridge 77 into the drive 62 to ensure that it is fully seated within.

The picker 94 is now retracted to position d of FIG. 9a, thereby raising the plunger 132. The carriage 64 is then moved to the right until the plunger 132 is above the elongated slot 170 in the actuation arm 166. The picker is then moved to position e of FIG. 9a, lowering the plunger 132 through the slot 170 in the arm 166. The carriage 64 is now moved back to the left, dragging the arm 166 along with it until it is in position f of FIG. 9c, thereby actuating the drive 62.

When a cartridge 77 is to be removed from a drive 62 and returned to a storage rack 74, the carriage 64 is moved along its drive shaft 66 until the plunger 132 is just to the left side of the arm 166, which is now in position f of FIG. 9c. The picker is extended to position e of FIG. 9a, lowering the plunger 132 below the level of and to the left of the arm 166. The carriage is then moved to the right, pushing the actuation arm 166 over to position g of FIG. 9c, thereby disengaging and ejecting the cartridge from the drive 62. The picker 94 may now engage the notch 102 in the ejected cartridge 77 in the manner described in detail above and return the cartridge 77 to a storage rack 74.

As is well known to those of skill in the art, DLT format tape drives include an engagement lever 174 which is used to manually rotate the actuation shaft 164 to engage and eject tape cartridges from the drive when the drive is used in an unautomated system. Typically, as is illustrated in FIG. 9d, the lever 174 protrudes outward from the front face of the drive when a tape cartridge is ejected, and is rotated to be approximately flush with the front face of the drive when the drive is engaged and operating (although for illustrative clarity, the lever 174 is shown short of flush in position f). In some models of DLT tape drive, this lever 174 can interfere with the extension of the picker 94 toward the notch 102 when retrieving a tape cartridge 77 from a drive 62. This is because the width of the lever 174 coupled with the extent to which it rotates away from the front face of the drive 62 and toward the left face of the tape cartridge 77 upon cartridge disengagement may block the picker 94 extension along the left side of the cartridge 77 prior to engagement with the notch 102.

This problem may be solved by not rotating the actuation shaft 164 to its limit, but stopping prior to the point where the lever 174 begins to interfere with the picker 94 extension path. This does not cause a problem with tape cartridge ejection from the drive 62 because drive disengagement and cartridge ejection occurs before the actuator shaft 164 is rotated to its limit.

However, a complication arises because if the lever 174 and shaft 164 are not turned all the way to their limit, the shaft 164 and handle 174 tend to slip back into the actuated position f of FIG. 9d. This is especially undesirable because the drives may spend a significant portion of time in the disengaged and open state without a tape cartridge installed.

Figure 9E:
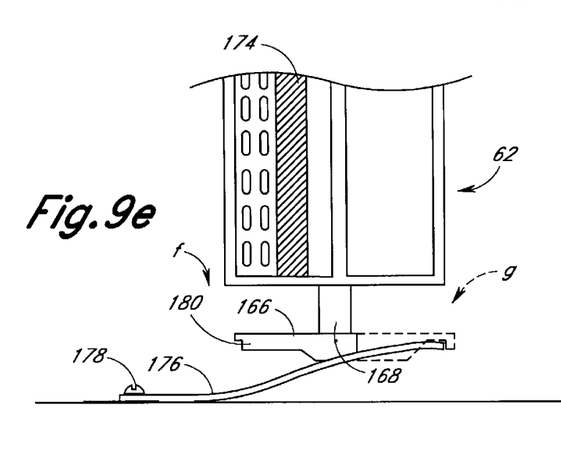
FIG. 9e illustrates a front plan view of the media element reader of FIG. 9d.

FIGS. 9d and 9e illustrate a preferred solution to this problem. As seen in FIG. 9e, an elongated resilient metal locking tab 176 is secured with a screw 178 to the module 10 floor in front of each drive 62 beneath the actuating arm 166 which extends outward from the actuating shaft 164. The locking tab 176 rises off of the floor of the module as it extends away from its point of connection to the module floor until it contacts the bottom surface of the actuating arm 166. The locking tab 176 therefore exerts a small upward force on the bottom of the actuating arm 166.

The length of the locking tab 176, and therefore its extension away from its securement point in the module 10 floor, is chosen so as to lock the lever 174 in its appropriate open and disengaged position and prior to potential interference with picker 94 extension. This is accomplished by providing a lip 180 on one side of the actuating arm 166 which extends downward slightly from the rightmost side of the actuating arm 166. The length of the locking tab 176 is then chosen so that when the actuating arm 166 has been displaced the desired amount, shown as position g in FIGS. 9d and 9e, the locking tab 176 snaps just to the left of the downwardly projecting lip 180 on the side of the actuating arm 166. Preferably, the upper end of the tab 176 is cut an an angle rather than square, so that the lip 180, which crosses locking tab 176 at an angle, mates cleanly with the end of the tab 176.

Furthermore, the locking tab 176 is provided with a lengthwise extending slot 182. As can be appreciated from FIG. 9d, the slot 182 extends from near the attachment point of the locking tab 176 to the module floor 10 up along the locking tab length until its rightward end is flush with the leftward edge of the actuation arm 166 when the actuation arm 166 is in the disengaged position at position g of FIGS. 9d and 9e.

The beneficial function of the locking tab 176 is therefore produced in the following manner. As explained above, when ejecting a tape cartridge 77 from a drive 62 for transfer back to a storage rack 74, the active transfer carriage 64 is moved along its drive shaft 66 until the plunger 132 is just to the left side of the arm 166, which is in position f of FIG. 9d. The picker is extended to position e of FIG. 9a, lowering the plunger 132 below the level of and to the left of the arm 166. The plunger 132 also passes through the lower end of the slot 182 in the locking tab 176. The carriage is then moved to the right, pushing the actuation arm 166 toward position g of FIG. 9d. During this rightward motion, the lip 180 rides along the top surface of the locking tab 176. As the actuation arm 176 reaches position g, the lip portion of the actuation arm 166 snaps over the end of the locking tab 176. At essentially the same time, the plunger 132 hits the uppermost end of the slot 182 in the locking tab 176, preventing further rightward carriage motion and therefore also further rotation of the actuating arm 166 and shaft 164. Because the lip 180 extends downward over the end of the resilient locking tab 176, the actuation arm 166 is prevented from slipping back toward position f of FIGS. 9d and 9e, which is the actuated position.

Actuation arm 166 release from the locking tab 176 in order to actuate the drive is also accomplished via plunger 132 operation. As previously explained, when the drive is to be engaged to an inserted tape cartridge 77, the carriage 64 is positioned such that the plunger 132 is above the elongated slot 170 in the actuation arm 166. The picker is then moved to position e of FIG. 9a, lowering the plunger 132 through the slot 170 in the arm 166. The slot 182 in the locking tab 176 lies entirely to the left of the slot 170 in the actuation arm 166. As can be seen therefore by examination of position g in FIGS. 9d and 9e, the solid end portion of the locking tab is in resilient contact with the bottom of the actuating arm 166 beneath the actuating arm slot 170. Therefore, when the plunger 132 is extended downward through the actuating arm slot 170, it also pushes down on the locking tab 176, pushing its end below the lip 180 on the actuating arm 166, and thereby freeing the actuation arm 166 for the leftward motion which engages the drive 62 to the inserted tape cartridge 77. As described above, the carriage 64 may then be moved to the left, dragging the arm 166 along with it until it is in position f of FIG. 9d, thereby actuating the drive 62.

The present invention therefore provides an automated media element library with a minimum of complexity and a maximum of flexibility. The foregoing description details certain preferred embodiments of the present invention and describes the best mode contemplated. It will be appreciated, however, that no matter how detailed the foregoing appears in text, the invention can be practiced in many ways and the invention should be construed in accordance with the appended claims and any equivalents thereof.

What is claimed is:

1. A modular data storage and retrieval system comprising:

a plurality of removable modules mounted in series in a cabinet, wherein at least one of said modules houses a plurality of media elements, wherein at least one of said modules houses one or more media element readers, and wherein at least two of said modules incorporate an integral pass through slot for passing media elements into and out of the modules; and a passive transfer carriage external to said series of said plurality of modules, wherein said passive transfer carriage includes no electrically actuated mechanism for moving a media element into or out of one of said modules and wherein said passive transfer carriage is positionable adjacent to individual ones of said pass through slots such that said passive transfer carriage thereby accepts a media element from one of said modules and delivers said media element to a different one of said modules when said series is contiguous and when said series has been interrupted by the removal of any individual one of said modules.

2. The data storage and retrieval system of claim 1, wherein at least one module houses media elements but no media element readers, and at least one module houses both media elements and at least one media element reader.

3. The data storage and retrieval system of claim 1 wherein the media elements comprise magnetic tape cartridges.

4. The data storage and retrieval system of claim 1, wherein at least one module additionally houses an active transfer carriage, said active transfer carriage being operative to insert a media element into said passive transfer carriage, and to extract said media element from said passive transfer carriage.

5. The data storage and retrieval system of claim 4, wherein said active transfer carriage comprises a picker and said media element comprises a notch, said picker being moveable to engage said notch and to thereby push said media element into said passive transfer carriage and to extract said media element from said passive transfer carriage.

6. The data storage and retrieval system of claim 5, wherein one end of said picker is substantially hook shaped.

7. The data storage and retrieval system of claim 1, wherein said modules are disposed in vertical relation to one another, and wherein said passive transfer carriage comprises a vertically moveable passive elevator.

* * * * *